United States Patent
Patel et al.

(10) Patent No.: US 11,945,524 B2
(45) Date of Patent: Apr. 2, 2024

(54) WORK VEHICLE UNDERCARRIAGE CLEARANCE SYSTEM AND METHOD

(71) Applicant: Deere & Company, Moline, IL (US)

(72) Inventors: Nikunj Patel, Surendranagar (IN); Aditya Shenoy, Pune (IN); Dnyaneshwar J. Jagtap, Dhule (IN); Sanket Pawar, Pune (IN)

(73) Assignee: DEERE & COMPANY, Moline, IL (US)

( * ) Notice: Subject to any disclaimer, the term of this patent is extended or adjusted under 35 U.S.C. 154(b) by 486 days.

(21) Appl. No.: 17/211,240

(22) Filed: Mar. 24, 2021

(65) Prior Publication Data

US 2022/0306218 A1    Sep. 29, 2022

(51) Int. Cl.
*B60Q 1/00* (2006.01)
*B62D 55/084* (2006.01)
*E02F 9/26* (2006.01)

(52) U.S. Cl.
CPC .............. *B62D 55/084* (2013.01); *E02F 9/26* (2013.01); *E02F 9/261* (2013.01)

(58) Field of Classification Search
CPC ........... B62D 55/084; E02F 9/26; E02F 9/261
USPC ....................................................... 340/436
See application file for complete search history.

(56) References Cited

U.S. PATENT DOCUMENTS 8,836,538 B2    9/2014  Ma et al.
2003/0014165 A1   1/2003  Baker et al.
2009/0076674 A1   3/2009  Kiegerl et al.
2013/0182066 A1   7/2013  Ishimoto
2015/0066291 A1   3/2015  Johannsen et al.
(Continued)

FOREIGN PATENT DOCUMENTS

DE    102011115353 A1    4/2012
DE    112014001069 T5    11/2015
(Continued)

OTHER PUBLICATIONS

Goodrich, Michael A., Potential Fields Tutorial, undated admitted prior art. (9 pages).
(Continued)

*Primary Examiner* — Naomi J Small
(74) *Attorney, Agent, or Firm* — KLINTWORTH & ROZENBLAT IP LLP

(57) ABSTRACT

An undercarriage clearance system includes a datastore containing undercarriage geometry data including ground clearance data of the undercarriage assembly across a lateral dimension of a wheelbase of the work vehicle; a first sensor configured to collect ground environment data within the vehicle trajectory; and a controller. The controller is configured to: receive the undercarriage geometry data from the datastore; receive the ground environment data from the first sensor; identify an obstacle within the vehicle trajectory; evaluate a height of the identified obstacle and a projected path of the obstacle within the wheelbase of the work vehicle along the vehicle trajectory relative to the undercarriage geometry data to determine an obstacle clearance expectation; and generate an alert command signal based on the determination of the obstacle clearance expectation. A display device is configured to render a display based on the alert command signal representing the obstacle clearance expectation.

18 Claims, 6 Drawing Sheets

(56) References Cited

U.S. PATENT DOCUMENTS

| | | | |
|---|---|---|---|
| 2016/0176686 A1 | 6/2016 | Schoonmaker | |
| 2016/0339959 A1* | 11/2016 | Lee | G06V 20/588 |
| 2017/0169703 A1* | 6/2017 | Carrasco | B60R 1/00 |
| 2019/0009719 A1* | 1/2019 | Kondo | B60R 1/00 |
| 2020/0349838 A1* | 11/2020 | Schuller | G08G 1/096844 |

FOREIGN PATENT DOCUMENTS

| | | | | |
|---|---|---|---|---|
| DE | 102014221990 B4 | 8/2021 | | |
| DE | 102020131281 A1 | 6/2022 | | |
| EP | 3689714 A1 | 8/2020 | | |
| WO | WO-2014148978 A1 * | 9/2014 | | B62D 15/0265 |
| WO | WO2014148978 A1 | 9/2014 | | |
| WO | 2016199171 A1 | 12/2016 | | |

OTHER PUBLICATIONS

German Search Report issued in application No. DE102022201271.2 dated Mar. 22, 2023 (16 pages).
Finnish Office Action issued in Patent Application No. 20225092, dated Aug. 31, 2022, in 08 pages.

* cited by examiner

WORK VEHICLE UNDERCARRIAGE CLEARANCE SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a work vehicle system and method, and more specifically to an undercarriage clearance system and method for the work vehicle.

BACKGROUND OF THE DISCLOSURE

In the agriculture, construction, and forestry industries, work vehicles are utilized to perform a number of different tasks in various types of environments, including environments with unexpected or unknown obstacles. As one example, a tree feller buncher operates in a forest environment that contains rocks and stumps. Such obstacles may be challenging to identify, evaluate, and/or maneuver through. Generally, such tasks require significant attention by the operator of the vehicle.

SUMMARY OF THE DISCLOSURE

The disclosure provides an undercarriage clearance system and method for a work vehicle.

In one aspect, the disclosure provides an undercarriage clearance system for a work vehicle configured to operate along a vehicle trajectory. The undercarriage clearance system includes a datastore containing undercarriage geometry data associated with an undercarriage assembly of the work vehicle including ground clearance data of the undercarriage assembly across a lateral dimension of a wheelbase of the work vehicle; a first sensor configured to collect ground environment data within the vehicle trajectory; and a controller coupled to the first sensor and the datastore. The controller has a processor and memory architecture configured to: receive the undercarriage geometry data from the datastore; receive the ground environment data from the first sensor; identify an obstacle within the vehicle trajectory; evaluate a height of the identified obstacle and a projected path of the obstacle within the wheelbase of the work vehicle along the vehicle trajectory relative to the undercarriage geometry data to determine an obstacle clearance expectation; and generate an alert command signal based on the determination of the obstacle clearance expectation. The undercarriage clearance system further includes a display device coupled to the controller to receive the alert command signal and configured to render a display based on the alert command signal representing the obstacle clearance expectation.

In another aspect, the disclosure provides a method of operating an undercarriage clearance system for a work vehicle configured to operate along a vehicle trajectory. The method includes: collecting, with a first sensor, ground environment data within the vehicle trajectory; receiving, at a controller, the ground environment data from the first sensor; accessing, by the controller from a datastore, undercarriage geometry data associated with an undercarriage assembly of the work vehicle including ground clearance data of the undercarriage assembly across a lateral dimension of a wheelbase of the work vehicle; identifying, with the controller, an obstacle within the vehicle trajectory; evaluating, with the controller, a height of the identified obstacle and a projected path of the obstacle within the wheelbase of the work vehicle along the vehicle trajectory relative to the undercarriage geometry data to determine an obstacle clearance expectation; generating, with the controller, an alert command signal based on the determination of the obstacle clearance expectation; and rendering, on a display device, a display based on the alert command signal representing the obstacle clearance expectation.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
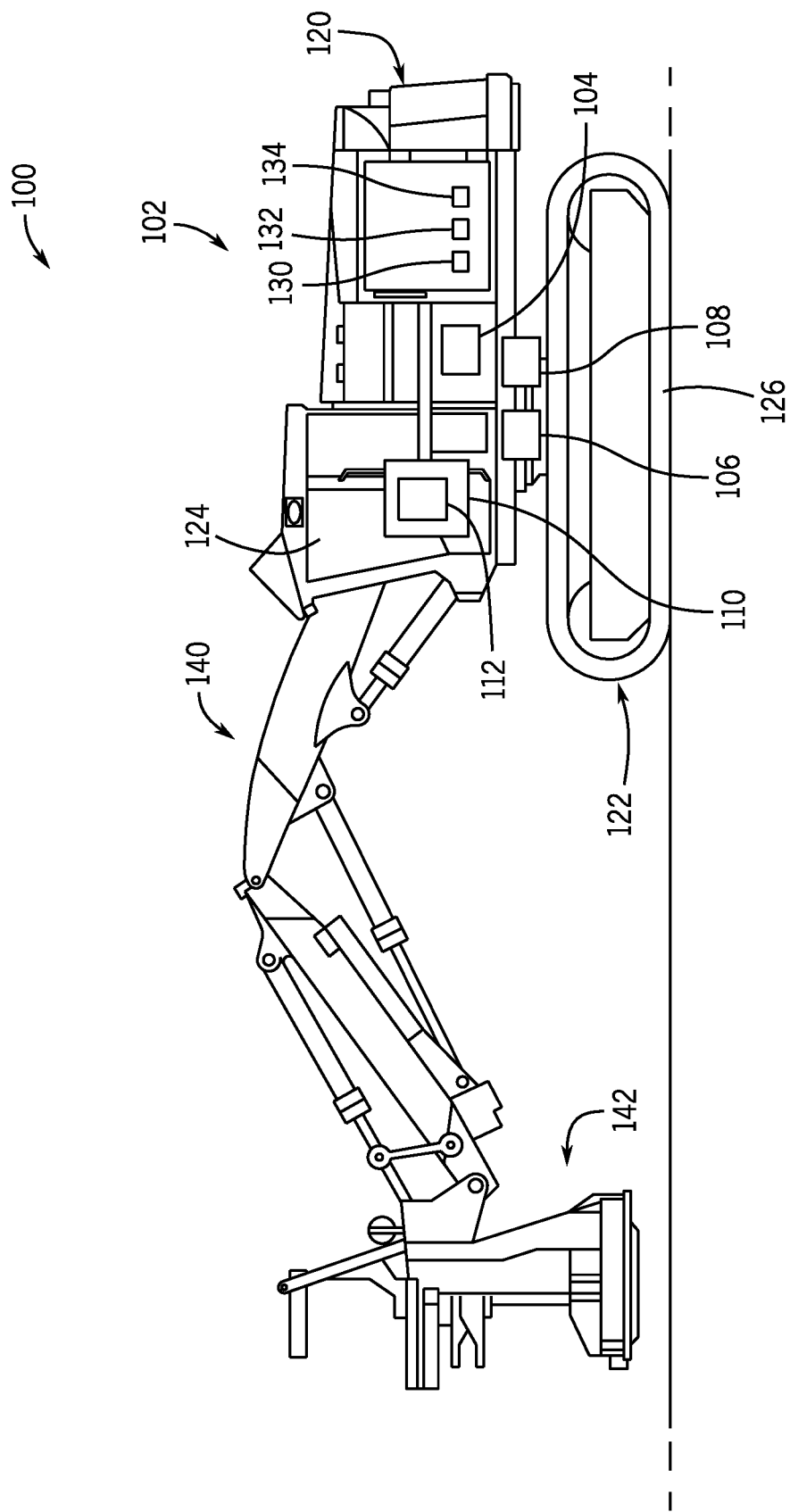
FIG. 1 is a side view of an example work vehicle with an undercarriage clearance system in accordance with an embodiment of this disclosure.

The following describes one or more example embodiments of the disclosed undercarriage clearance system, method, or work vehicle, as shown in the accompanying figures of the drawings described briefly above. Various modifications to the example embodiments may be contemplated by one of skill in the art.

In the agriculture, construction, and forestry industries, work vehicles are utilized to perform tasks in various types of environments. As an example within the forestry industry, a tree feller buncher operates to harvest trees and other wood vegetation in a forest environment that contains rocks and stumps. The obstacles within the work environment may present issues for an operator attempting to perform the primary task (e.g., harvesting trees). For example, such obstacles may be challenging to identify, evaluate, and/or maneuver through, and generally require additional attention and judgment from the operator of the vehicle. Even if the work vehicle is able to pass over such obstacles, contact may result in undue wear on a vehicle undercarriage assembly and impact task or travel efficiency. Similar situations exist for operators of other forestry vehicles, as well as vehicles in the agriculture and construction industries.

According to the present disclosure, the work vehicle may implement an undercarriage clearance system in order to facilitate operation in an environment with obstacles. As described below, the undercarriage clearance system includes sensors to identify objects in front of the work vehicle as potential obstacles and to determine the trajectory of the work vehicle. The undercarriage clearance system then identifies which of the potential obstacles are within the trajectory and evaluates the obstacles within the trajectory to determine the nature of the risk that the obstacle presents to the work vehicle as a determination of the obstacle clearance expectation in view of the geometry of the undercarriage assembly of the work vehicle. In particular, the undercarriage clearance system may include or otherwise access a datastore containing undercarriage geometry data associated with an undercarriage assembly, including ground clearance data that defines, within the lateral dimension of the wheelbase of the work vehicle, locations of greater or lesser spacing of the undercarriage assembly from a reference ground plane on which ride ground-engaging wheels or tracks of the work vehicle. During operation, the undercarriage clearance system evaluates a height of the identified obstacle and a projected path of the obstacle within the wheelbase of the work vehicle along the vehicle trajectory relative to the undercarriage geometry data to determine the obstacle clearance expectation. As examples, the obstacle clearance expectations associated with an identified object may include: (1) an obstacle is within the current trajectory but the particular portion of the undercarriage assembly that is anticipated to intersect with the location of the obstacle has a sufficient clearance to pass over the obstacle without issue (e.g., will not contact the undercarriage assembly); (2) an obstacle is within the current trajectory and the particular portion of the undercarriage assembly does not have sufficient clearance to pass over the obstacle, but other portions of the undercarriage assembly would be able to pass over the obstacle without issue; and/or (3) an obstacle is within the current trajectory of the work vehicle and no portion of the undercarriage assembly has sufficient clearance to pass over the obstacle without issue. In one example, the undercarriage clearance system may consider and subsequently disregard identified objects that are not within the within the current trajectory and therefore not an issue. In response to the obstacle clearance expectations, the undercarriage clearance system may render displays for the operator that present information about the nature of the obstacle, including the position, size, and distance of the obstacle relative to the work vehicle. The undercarriage clearance system may also provide information for the operator to respond to the obstacle. As such, the undercarriage clearance system provides a mechanism to prevent or mitigate unexpected obstacles in unstructured environments, thereby enabling a more efficient and robust operation and improvements to the life of the work vehicle, particularly the undercarriage assembly. Additional details will be provided below.

Referring to FIG. 1, a work vehicle 100 may include or otherwise implement an undercarriage clearance system 102 that identifies, evaluates, and informs the operator about potential obstacles within the trajectory of the work vehicle 100. In FIG. 1, an example of the work machine 100 as a track feller buncher is shown. Tree feller bunchers generally operate to cut a tree and place the tree in bunches on the ground for further processing with other machines. The present disclosure is not limited, however, to feller bunchers. Other work machines may include swing machines or skidders. Moreover, the undercarriage clearance system 102 may be suitable for other industries in which obstacles are an issue, such as construction and agriculture. As such, while the figures and forthcoming description may relate to a track feller buncher, it is to be understood that the scope of the present disclosure is intended to be broader and encompass other "work vehicles" for purposes of this disclosure. In one example, the undercarriage clearance system 102 may be considered to include or otherwise interact with a controller 104; one or more sensors 106, 108, datastores, and/or other sources of data; and at least one operator interface 110 with a display device 112, each of which will be discussed in greater detail below after a brief description of the work vehicle 100.

In this example, the work vehicle 100 includes an upper frame assembly 120 supported by an undercarriage assembly 122. The upper frame assembly 120 may include a cab 124 in which an operator utilizes the operator interface 110 for interacting with and controlling the vehicle 100 and the undercarriage clearance system 102, as discussed below. As shown, the undercarriage assembly 122 functions to support the upper frame assembly 120 and further includes tracks 126 on each lateral side to propel and/or maneuver the work vehicle 100 along the ground. In other examples, the undercarriage assembly 122 is supported by wheels. The undercarriage assembly 122 may be considered to include a collection of various components between the lateral dimension of the wheelbase that, for the purposes of the undercarriage clearance system 102, form portions or locations of greater or lesser spacing from a reference ground plane on which the tracks 126 of the work vehicle 100 engage the ground. As described in greater detail below, the undercarriage assembly 122, particularly the locations of greater or lesser spacing, impacts the ability of the work vehicle 100 to travel over obstacles. In some examples, the upper frame assembly 120 may be mechanically coupled to the undercarriage assembly 122 by a tilt mechanism and turntable assembly (not shown) that operably controls portions of the work vehicle 100 to be rotated and tilted about one or more axes.

The upper frame assembly 120 and/or undercarriage assembly 122 may further support a propulsion system 130, a steering system 132, and a braking system 134 (schematically shown) that facilitate operation of the work vehicle 100 based on operator commands (e.g., via operator interface 110). As examples, the propulsion system 130 includes one or more power sources (e.g., engines and/or motors) that generate power to propel the tracks 126 (e.g., via a transmission) and/or to power other vehicle components; the steering system 132 functions to manipulate the direction of the work vehicle 100; and the braking system 134 functions to slow or stop movement of the work vehicle 100. The tracks 126 interact directly with a support surface and are responsible for vehicle movement and tractive effort in a direction of travel along a trajectory resulting from interactions of the propulsion system 130, steering system 132, braking system 134, and operator interface 110.

The work vehicle 100 may further include a boom assembly 140 with one or more sections that support an implement 142. In this example, the boom assembly 140 includes a first boom section with a first end pivotably coupled to the upper frame assembly 120 and a second end pivotably coupled to a second boom section, which in turn, is coupled to the implement 142. Since the work vehicle 100 is a feller buncher in this example, the implement 142 is a wrist assembly supporting a felling head for cutting and bunching trees and other woody vegetation. The boom assembly 140 and/or implement 142 may include one or more actuators and/or hydraulic motors for manipulating and operating the boom sections and the implement tools.

Generally, the controller 104 implements operation of the undercarriage clearance system 102, as well as other systems and components of the work vehicle 100, including any of the functions described herein. The controller 104 may be configured as computing devices with associated processor devices and memory architectures, as hydraulic, electrical or electro-hydraulic controllers, or otherwise. As such, the controller 104 may be configured to execute various computational and control functionality with respect to the vehicle 100. The controller 104 may be in electronic, hydraulic, or other communication with various other systems or devices of the vehicle 100, including via a CAN bus (not shown). For example, the controller 104 may be in electronic or hydraulic communication with various actuators, sensors, and other devices within (or outside of) the vehicle 100.

In some embodiments, the controller 104 may be configured to receive input commands and to interface with an operator via the operator interface 110, including typical steering, acceleration, velocity, transmission, and wheel braking controls, as well as other suitable controls. The operator interface 110 may be configured in a variety of ways and may include one or more joysticks, various switches or levers, one or more buttons, a touchscreen interface, a keyboard, a speaker, a microphone associated with a speech recognition system, or various other human-machine interface devices.

In one particular example, the operator interface 110 includes the display device 112 that renders displays based on commands from the controller 104. Generally, the display device 112 may be an otherwise standard display device within the cab 124, such as an LCD or LED screen. The display device 112 may be mounted on the cab console, window-mounted, or head-mounted. In addition to display device 112, other output devices may be utilized to convey all or a portion of the information discussed below, including analog or digital gauges, other graphical or textual displays, and audio or haptic mechanisms. Examples of the displays generated by the controller 104 and rendered on the display device 112 of the operator interface 110 are discussed in greater detail below with reference to FIGS. 3-6.

As described in greater detail below, the controller 104 may include or otherwise access various types of datastores, including at least one datastore associated with the undercarriage assembly 12 as undercarriage geometry data and at least one datastore associated with the implement 144 as implement data. Generally, the undercarriage geometry data includes ground clearance or spacing information for the components between the lateral dimension of the wheelbase from a reference ground plane. The implement data may include information such as the type, characteristics, and capabilities of the implement 142.

The controller 104 may also receive inputs from one or more sensors associated with the various system and components of the work vehicle 100, including sensors 106, 108 introduced above. Generally, the sensor 106 may be an environment sensor 106 that functions to collect information about objects and terrain in front of the work vehicle 100, and the sensor 108 may be a position sensor 108 that functions to collect information about the orientation, kinematics, and/or trajectory of the work vehicle 100.

As examples, the environment sensor 106 includes one or more of the following devices: a scanning laser, radar, lidar, laser range finder, range finder, ultrasonic obstacle detector, a stereo vision system, a monocular vision system, a camera, and an imaging unit. Generally, the environment sensor 106 may scan the environment to determine a location and size of any obstacle in front of the work vehicle 100. The environment sensor 106 may have any suitable or appropriate field of view, such as 30°. In one example, the environment sensor 106 is mounted on a forward portion of the undercarriage assembly 122, and in another example, the environment sensor 106 may be mounted on the underside of the cab 124. Any suitable location may be provided.

Moreover, the environment sensor 106 may include or associated with a light source.

Broadly, the position sensor 108 represents one or more sensors that collect information sufficient to determine a trajectory as the anticipated path of travel. In one example, the position sensor 108 may include an inertial measurement unit (IMU) and/or other devices that collect information associated with the velocity, acceleration, heading, and/or orientation of the work vehicle 100. In one example, the position sensor 108 may be mounted proximate to or on the swing joint between the upper frame assembly 120 and the undercarriage assembly 122, although other positions may be provided. In further examples, the position sensor 108 may include a GPS receiver to determine a current position and/or change in position over time.

The work vehicle 100 may further include various other types of sensors to provide various types of feedback and data with the controller 104 in order to implement the functions described herein, as well as functions typical for a work vehicle 100. In particular, sensors may collect information associated with the propulsion system 130, steering system 132, and/or braking system 134 in order to facilitate determining the trajectory and/or evaluating obstacles.

As described in greater detail below, the undercarriage clearance system 102 operates to identify and evaluate obstacles within the trajectory of the vehicle 100 and generate appropriate displays for the operator in response. An example controller 104 is depicted and discussed below with reference to FIG. 2 as implementing aspects of the undercarriage clearance system 102, and subsequently, additional details about the output of the undercarriage clearance system 102 are provided with reference to FIG. 3-6.

Figure 2:
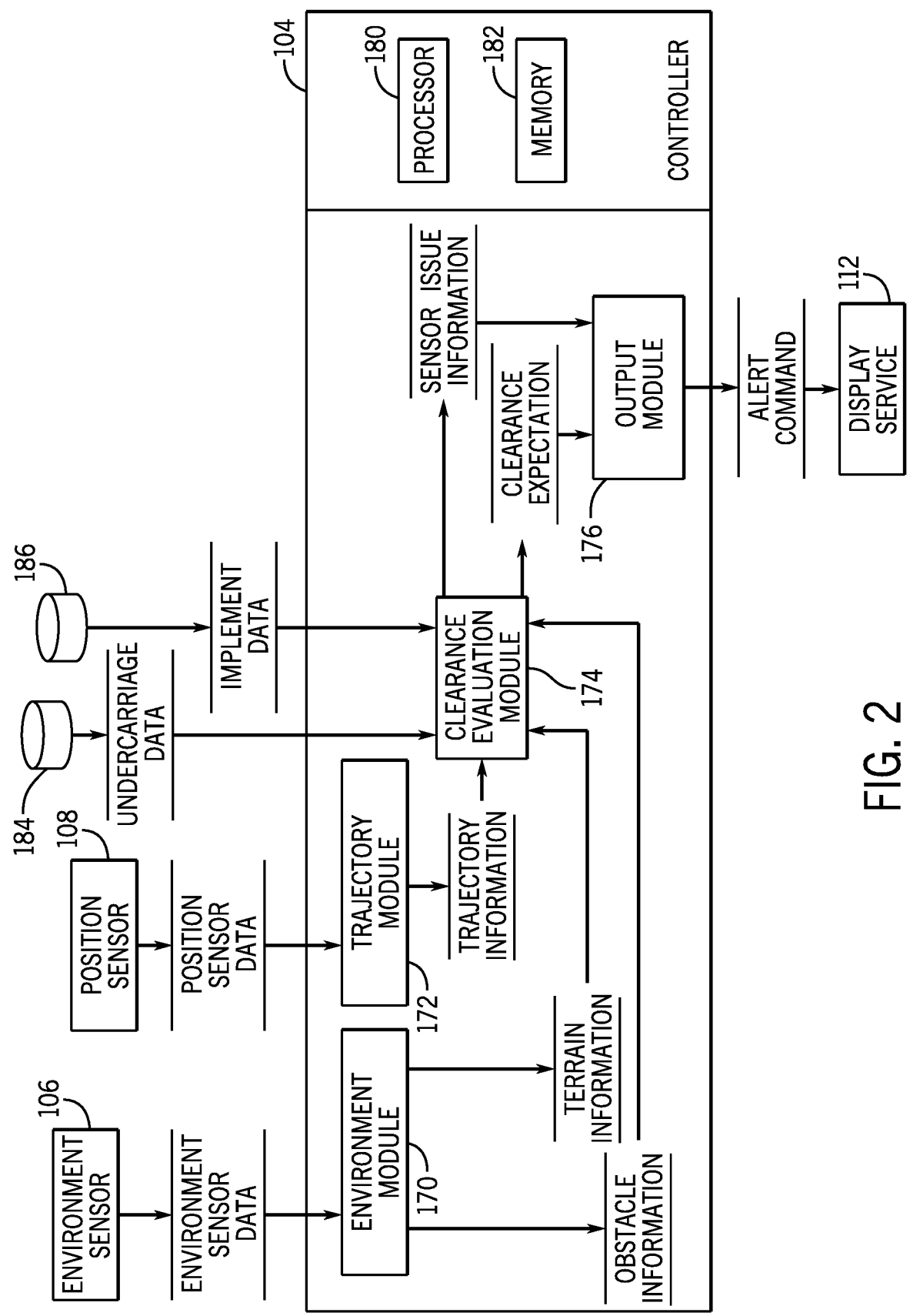
FIG. 2 is an example dataflow diagram of a controller for implementing the undercarriage clearance system of FIG. 1 in accordance with an embodiment.

Referring to FIG. 2, a dataflow diagram illustrates an embodiment of the undercarriage clearance system 102 implemented by the controller 104 (as well as sensors 106, 108, display device 112, and datastores 184, 186). Generally, the controller 104 may be considered a vehicle controller, a dedicated controller, or a combination of controllers. With respect to the undercarriage clearance system 102 of FIG. 2, the controller 104 may be organized as one or more functional units or modules 170, 172, 174, 176 (e.g., software, hardware, or combinations thereof). As can be appreciated, the modules 170, 172, 174, 176 shown in FIG. 2 may be combined and/or further partitioned to carry out similar functions to those described herein. As an example, each of the modules 170, 172, 174, 176 may be implemented with processing architecture such as a processor 180 and memory 182, as well as suitable communication interfaces. For example, the controller 104 may implement the modules 170, 172, 174, 176 with the processor 180 based on programs or instructions stored in memory 182. In some examples, the consideration and implementation of the undercarriage clearance system 102 by the controller 104 are continuous, e.g., constantly active. In other examples, the activation may be selective, e.g., enabled or disabled based on input from the operator or other considerations.

Generally, the controller 104 may receive input data in a number of forms and/or from a number of sources, including sensors 106, 108 and datastores 184, 186. Generally, the datastores 184, 186 may be stored as part of memory 182 or external to the controller 104. Moreover, such input data may also come in from other systems or controllers, either internal or external to the work vehicle 100. This input data may represent any data sufficient to identify and evaluate obstacles within the trajectory of the work vehicle 100 and to provide information about the evaluated obstacles to the operator of the work vehicle 100, as described below. In one example, the controller 104 may be considered to include an environment module 170, a trajectory module 172, a clearance evaluation module 174, and an output module 176 to implement the functions of the undercarriage clearance system 102. Each module 170, 172, 174, 176 may generate responses based on predetermined rules or algorithms stored in memory 182.

In general, the environment module 170 is configured to generate obstacle and terrain information about the environment in which the work vehicle 100 is operating. In one example, the environment sensor 106 scans the area in front of the work vehicle 100 during operation, and the environment module 170 receives and evaluates this data to identify objects within the environment. The environment module 170 may generate and/or determine the characteristics of the identified objects, including the size (e.g., height and width), shape, and location of the objects. In one example, the environment module 170 may dismiss or otherwise ignore objects that are below a predetermined size and consider the remaining objects as obstacles. The environment module 170 provides the obstacle information to the clearance evaluation module 174.

In some examples, the environment module 170 may also identify the characteristics of the surrounding terrain, particularly with respect to consideration of the associated obstacles. In particular, the environment module 170 may identify inclines and/or declines in terrain in front of or immediately behind the obstacles. Such inclines and declines may impact the potential interactions between the respective obstacle and the work vehicle 100. The terrain information may be provided by the environment module 170 to the clearance evaluation module 174. With respect to the obstacle information and/or the terrain information, the environment module 170 may additionally supplement the sensor information with mapping and historical data of the relevant terrain, including the known obstacles within the terrain.

The trajectory module 172 may receive various types of information, including the position sensor data from position sensor 108. Other data considered may include the speed and the commanded direction of the work vehicle 100. Generally, the trajectory module 172 may receive and consider any type of data and information that enable the determination of the trajectory of the work vehicle 100. The current and anticipated trajectory generally includes the current heading of the work vehicle 100. In some instances, the current trajectory may be a predetermined trajectory that the work vehicle 100 may be following, either manually, autonomously, or semi-autonomously. In any event, the trajectory module 172 provides the trajectory information to the clearance evaluation module 174.

The clearance evaluation module 174 receives the obstacle information and the terrain information from the environment module 170 and the trajectory information from the trajectory module 172. The clearance evaluation module 174 may additionally receive and/or access information associated with the undercarriage assembly 122 and/or the implement 142 of the work vehicle 100 from datastores 184, 186. For example, the information associated with the undercarriage assembly 122 may include the geometry of the undercarriage assembly 122 and the clearances of various portions of the undercarriage assembly 122 relative to the ground. The information associated with the implement 142 may include the type, characteristics, and capabilities of the implement 142.

In one example, the clearance evaluation module 174 projects the path of the obstacle within the wheelbase of the work vehicle 100 along the vehicle trajectory. The clearance evaluation module 174 further evaluates the height of the identified obstacle along the projected path in view of the undercarriage geometry data to determine an obstacle clearance expectation that reflects if and how the identified obstacle will contact a portion of the undercarriage assembly 122 at the present intersection of the obstacle and the work vehicle 100. Such evaluation may further be considered with respect to the terrain information and/or the implement data. Generally, the clearance evaluation module 174 may characterize the obstacle clearance expectation in a number of ways to reflect a risk (or severity) condition of the each identified obstacle, including: (1) a first obstacle clearance expectation in which the obstacle is within the current trajectory of the work vehicle 100 but the particular portion of the undercarriage assembly 122 that is anticipated to intersect with the location of the obstacle has a sufficient clearance such that the undercarriage assembly 122 passes over the obstacle without issue (e.g., will not contact the undercarriage assembly 122); (2) a second obstacle clearance expectation in which the obstacle is within the current trajectory of the work vehicle 100 and the particular portion of the undercarriage assembly 122 does not have sufficient clearance to pass over the obstacle, but other portions of the undercarriage assembly 122 would be able to pass over the obstacle without issue; and/or (3) a third obstacle clearance expectation in which the obstacle is within the current trajectory of the work vehicle 100 and no portion of the undercarriage assembly 122 has sufficient clearance to pass over the obstacle without issue. In one example, the undercarriage clearance system 102 may consider and ignore objects that are not within the within the current trajectory and therefore not an issue for the work vehicle 100.

The clearance evaluation module 174 may generate various types of responses to the obstacle clearance expectations, and such responses may be characterized in any suitable manner. In one example, the first obstacle clearance expectation (e.g., obstacle within the trajectory, but not an issue) may be considered an advisory; the second obstacle clearance expectation (e.g., obstacle within the trajectory and presently an issue, but may be remedied with some adjustments to trajectory) may be considered a warning; and the third obstacle clearance expectation (e.g., obstacle within the trajectory and unable to pass over) may be considered an alarm. Additionally, the clearance evaluation module 174 may generate suggestions or recommendations associated with one or more of the obstacle clearance expectations. For example, in the second obstacle clearance expectation (e.g., obstacle within the trajectory and presently an issue, but may be remedied with some adjustments to trajectory), the clearance evaluation module 174 may suggest a direction of steering adjustment that enables the undercarriage assembly 122 to pass over the obstacle. As a further example, in the third obstacle clearance expectation (e.g., obstacle within the trajectory and unable to pass over), the clearance evaluation module 174 may suggest a direction of steering adjustment to go around the obstacle, a brake recommendation to stop the vehicle, and/or an implement usage recommendation to manipulate the obstacle. In some instances, the recommendations may be a function of the distance between the work vehicle 100 and the obstacle (e.g., whether or not there is distance to maneuver the work vehicle) and/or the nature or characteristics of the obstacle and/or implement 142. For example, the clearance evaluation module 174 may recommend that the operator use the implement 142 to reposition or remove the obstacle from the trajectory of the work vehicle 100, if the implement 142 has such capability given the nature of the obstacle. Such information, characterizations about, and responses to the obstacle clearance expectations associated with the obstacles may be collectively considered undercarriage clearance information and provided to the output module 176.

In addition to information about and/or characterization of the obstacle clearance expectations, the clearance evaluation module 174 may also identify issues associated with the environment sensor 106, particularly when the environment sensor 106 is obscured by debris. Such information may be derived from the obstacle information and/or the terrain information. For example, the clearance evaluation module 174 may interpret some identified obstacles or terrain as debris rather than actual obstacles or terrain. In other examples, the lack of obstacle or terrain identification may be evaluated as an issue with the sensors 106, 108, particularly an obscured lens on the environment sensor 106. In further examples, such information may be derived directly from the environment sensor data and/or generated by another component or module of the work vehicle 100. Regardless, the resulting sensor issue information may also be provided to the output module 176.

The output module 176 receives the undercarriage clearance information and the sensor issue information and generates appropriate output signals in the form of alert command signals. In one example, the output module 176 generates alert command signals that operate to render displays on the display device 112 with graphics, icons, symbology, and the like that convey the information to the operator, including the nature of the obstacle clearance expectations, sensor information, and other information associated with the undercarriage clearance and/or obstacle risk.

Generally, upon generating the alert command signals and rending the displays, the controller 104 continues to collect information and update the display, e.g., as the work vehicle 100 continues along the trajectory, as the trajectory changes, and as additional information is gathered. As such, the information about the obstacles within the environment will continue to be identified, evaluated, and displayed to the operator.

Reference is now made to FIGS. 3-6, which are example situation displays 190, 290, 390, 490 rendered by the undercarriage clearance system 102 on the display device 112 in response to the alert command signals discussed above. Generally, each of the example situation displays 190, 290, 390, 490 may include various types of symbology, icons, and text to inform the operator about the statuses, values, and/or conditions of a number of aspects of the work vehicle 100. More specifically, the example situation displays 190, 290, 390, 490 may additionally provide information associated with the obstacle clearance expectations such as those introduced above. Such situation displays 190, 290, 390, 490 may be dedicated for the undercarriage clearance system 102 or may further include information that is unrelated to undercarriage clearance system 102 (e.g., as part of a more generic or overall vehicle display).

Figure 3:
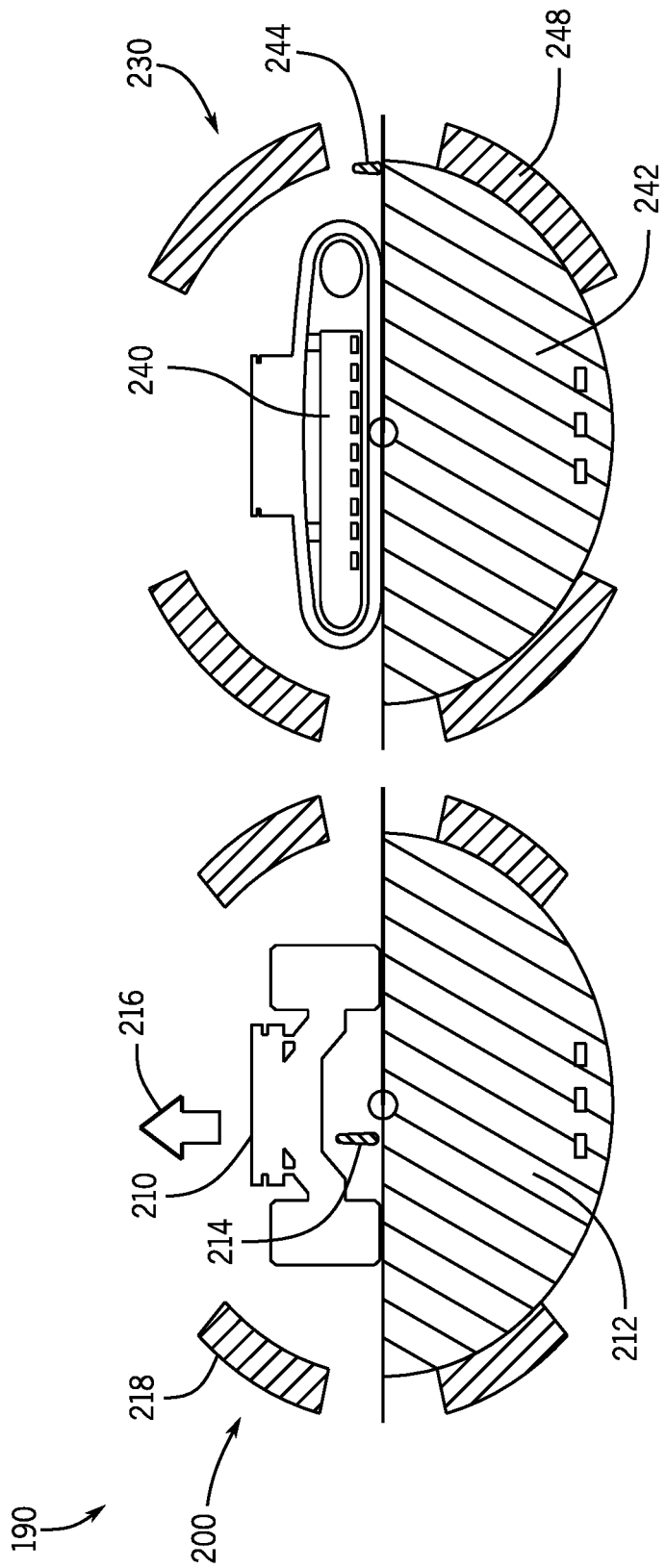
FIGS. 3-6 are example displays rendered by the undercarriage clearance system of FIG. 1 in accordance with an embodiment.

For example, and initially referring to FIG. 3, the situation display 190 may include symbology associated a forward view 200 and a side view 230 that represent corresponding and cooperating views of the relationship between the work vehicle 100 and an obstacle. In particular, the forward view 200 includes an undercarriage outline 210 of the work vehicle 100 on the ground 212 and symbology representing an obstacle 214 that has been identified within the trajectory of the work vehicle 100. In one example, the undercarriage outline 210 is a two-dimensional representation of the actual geometry of the undercarriage assembly 122 of the work vehicle 100, including the lowest spacings across each lateral dimension of the wheelbase along the longitudinal extent of the undercarriage assembly 122.

As shown, the forward view 200 depicts the relative lateral position of the obstacle 214 along the undercarriage outline 210 at which the work vehicle 100 is projected to intersect with the obstacle 214, as well as the relative vertical positions of the obstacle 214 and undercarriage outline 210 relative to the ground 212. As shown in the particular situation of FIG. 3, the obstacle 214 has a height and position such that the projected path of the obstacle 214 does not contact the undercarriage outline 210. In other words, although the obstacle 214 is within the trajectory of the work vehicle 100 and has a size that could be an issue if the work vehicle 100 had a different trajectory, the relative positions of the undercarriage outline 210 and the obstacle 214 indicate that the work vehicle 100 will pass over the obstacle 214 without issue if the current trajectory is maintained. In effect, the view of FIG. 3 represents the first obstacle clearance expectation discussed above.

The forward view 200 additionally has symbology 216, 218 that more generally represents the obstacle clearance expectation. For example, in FIG. 3, the arrow 216 is oriented in a forward direction, indicating that the work vehicle 100 may proceed along the current trajectory without issue. Further, the forward view 200 may include a ring 218 that has a color (e.g., blue) that represents the relative concern or severity of the obstacle clearance expectation. In further examples, other symbology, graphics, or visual effects may be provided to convey relative concern or severity of the obstacle clearance expectation, including alternative symbols, display backgrounds, and/or display backlight colors.

The side view 230 of the situation display 190 also represents the relationship between the work vehicle 100 and the obstacle. In particular, the side view 230 includes an undercarriage outline 240 of the work vehicle 100 on the ground 242 and symbology representing an obstacle 244 that has been identified within the trajectory of the work vehicle 100. Obstacle 244 of the side view 230 is the same obstacle as obstacle 214 in the forward view 200. As shown, the side view 230 depicts the relative longitudinal position of the obstacle 244 from the undercarriage outline 240 at which the work vehicle 100 is projected to pass over the obstacle 244. In other words, the side view 230 provides an indication of the distance between the obstacle 244 and the work vehicle 100. As shown in the particular situation of FIG. 3, the obstacle 214 is positioned at a relatively large distance from the work vehicle 100 (e.g., indicating that the work vehicle 100 has room to maneuver, if necessary or desired). The side view 230 additionally has symbology 248 that more generally represents the obstacle clearance expectation, particularly a ring 248 that has a color (e.g., blue) that represents the nature of the obstacle clearance expectation. In effect, the ring 248 mirrors the color and/or visual effect of the ring 218. As noted above, other mechanisms may be used to convey the relative concern or severity of the obstacle clearance expectation.

Additional symbology may be provided outside of the forward view 200 and side view 230. As an example, an icon may be provided to inform the operator about the obstacle but also indicate that the current trajectory of the work vehicle 100 is such that the obstacle is not presently an issue.

Figure 4:
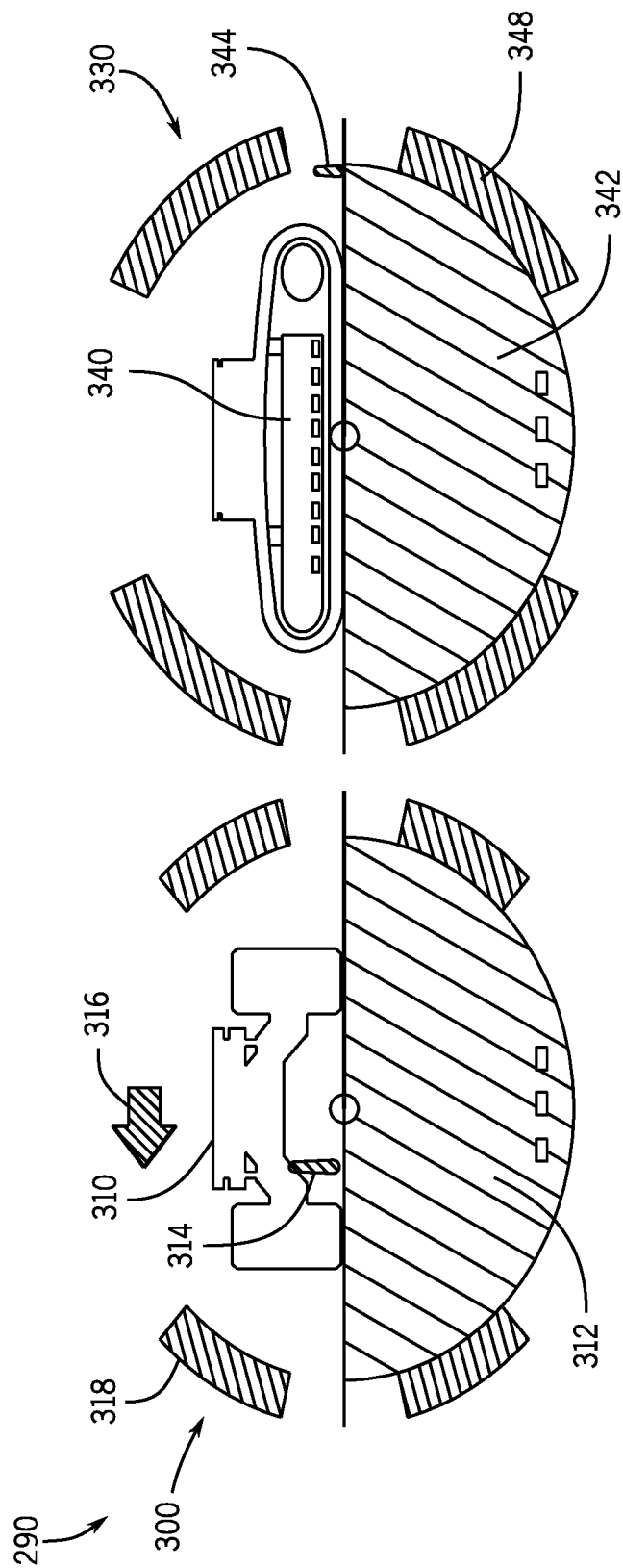

Like FIG. 3, the situation display 290 of FIG. 4 may include symbology associated a forward view 300 and a side view 330 that represent corresponding and cooperating views of the relationship between the work vehicle 100 and an obstacle. In particular, the forward view 300 includes an undercarriage outline 310 on the ground 312 and symbology representing an obstacle 314 that has been identified within the trajectory. As above, the forward view 300 depicts the relative lateral position of the obstacle 314 along the undercarriage outline 310 at which the work vehicle 100 is projected to intersect with the obstacle 314 and the relative vertical positions of the obstacle 314 and undercarriage outline 310 relative to the ground 312.

As shown in the particular situation of FIG. 4, the obstacle 314 partially overlaps with a portion of the undercarriage outline 310, thereby indicating that the obstacle 314 will contact or strike the undercarriage assembly 122 of the work vehicle 100 at the present trajectory. However, a comparison between the undercarriage outline 310 and the obstacle 314 indicates that, although the obstacle 314 overlaps the undercarriage outline 310 at a side portion with a relatively low clearance, the relative sizes indicate that the other, more central portion of the undercarriage outline 310 would clear the obstacle 314 if adjustments are made to the current trajectory. In effect, the view of FIG. 4 represents the second obstacle clearance expectation discussed above.

The forward view 300 additionally has symbology 316, 318 that more generally represents the obstacle clearance expectation and/or proposes a response to improve or address the obstacle clearance expectation. For example, in FIG. 4, the arrow 316 is oriented in a left direction to indicate the direction of trajectory adjustment that enables the work vehicle 100 to clearly pass over the obstacle 314. In other words, if the operator adjusts the trajectory of the work vehicle 100 to the left, the obstacle 314 will intersect the path at the center (and higher clearance) portion of the undercarriage outline 310. Further, the forward view 300 may include a ring 318 that has a color (e.g., yellow) that represents the relative concern or severity of the obstacle clearance expectation. In further examples, other symbology, graphics, or visual effects may be provided to convey relative concern or severity of the obstacle clearance expectation, including alternative symbols, display backgrounds, and/or display backlight colors.

The side view 330 of the situation display 290 also represents the relationship between the work vehicle 100 and the obstacle. In particular, the side view 330 includes an undercarriage outline 340 of the work vehicle 100 on the ground 342 and symbology representing the obstacle 344 that has been identified within the trajectory of the work vehicle 100. The side view 330 depicts the relative longitudinal position of the obstacle 344 from the undercarriage outline 340 at which the work vehicle 100 is projected pass over the obstacle 344. As shown in the particular situation of FIG. 4, the obstacle 344 is positioned at a relatively large distance from the work vehicle 100 (e.g., indicating that the work vehicle 100 has room to maneuver, if necessary or desired). The side view 330 additionally has symbology 348 that more generally represents the obstacle clearance expectation, particularly a ring 348 that has a color (e.g., yellow) that represents the nature of the obstacle clearance expectation. In effect, the ring 348 mirrors the color and/or visual effect of the ring 318. As noted above, other mechanisms may be used to convey the relative concern or severity of the obstacle clearance expectation.

Additional symbology may be provided outside of the forward view 300 and side view 330. As an example, an icon may be provided to inform the operator that the obstacle may be an issue.

As noted above, the undercarriage clearance system 102 may continue to monitor the incoming data such that, if the conditions change, the display 290 will be updated. As such, if the operator adjusts the trajectory, the display 290 will correspondingly adjust to the potential new obstacle clearance expectation that enables the operator to judge the proper amount of trajectory manipulation that allows the work vehicle 100 to pass over the obstacle. In other words, the operator may make changes to the trajectory to reduce the obstacle clearance expectation, e.g., perhaps reflecting a change from the second obstacle clearance expectation of FIG. 4 to the first obstacle clearance expectation of FIG. 3 that enables the work vehicle 100 to continue on the overall path.

Figure 5:
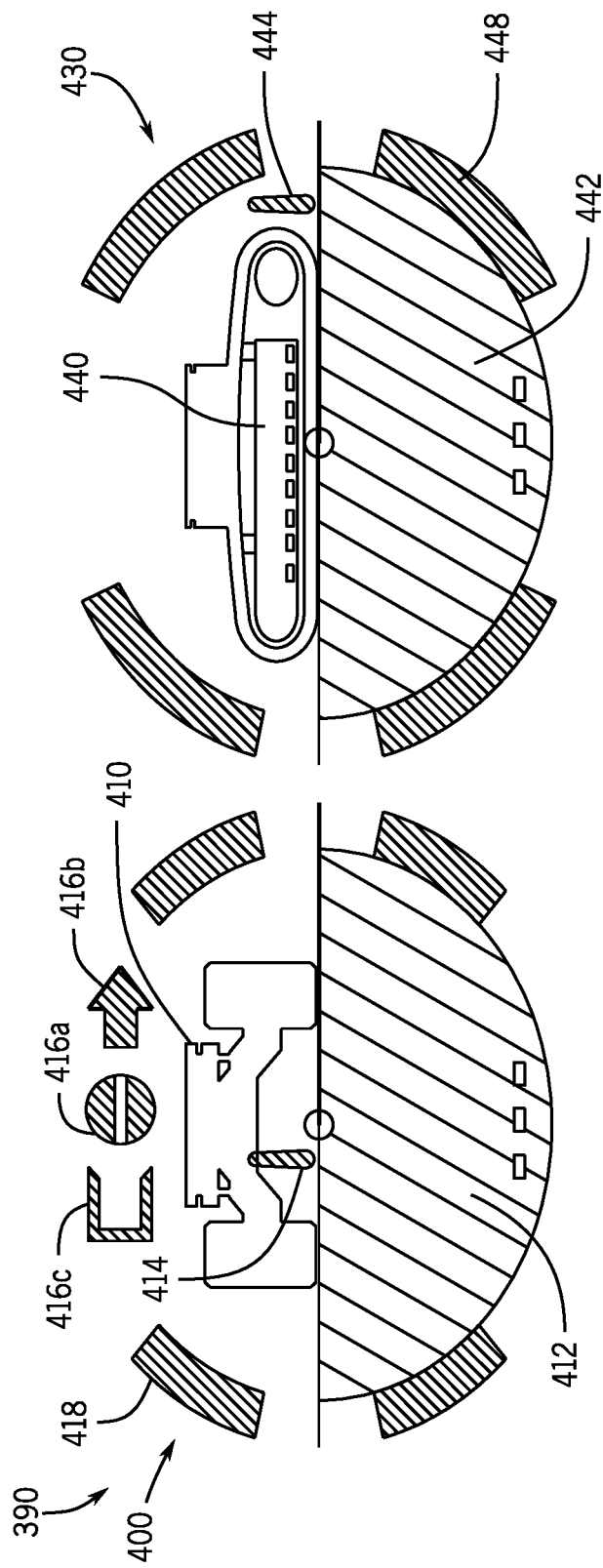

Like FIGS. 3 and 4, the situation display 390 of FIG. 5 may include symbology associated with a forward view 400 and a side view 430 that represent corresponding and cooperating views of the relationship between the work vehicle 100 and an obstacle. In particular, the forward view 400 includes an undercarriage outline 410 on the ground 412 and symbology representing an obstacle 414 that has been identified within the trajectory. As above, the forward view 400 depicts the relative lateral position of the obstacle 414 along the undercarriage outline 410 at which the work vehicle 100 is projected to intersect with the obstacle 414 and the relative vertical positions of the obstacle 414 and undercarriage outline 410 relative to the ground 412.

As shown in the particular situation of FIG. 5, the obstacle 414 partially overlaps a portion of the undercarriage outline 410, thereby indicating that the obstacle 414 will contact or strike the undercarriage assembly 122 of the work vehicle 100 at the present trajectory. Additionally, as indicated by the relative size of the obstacle 414 as compared to the other portions of the undercarriage outline 410, it is evident that no portion of the undercarriage outline 410 would clear the obstacle 414 if the work vehicle 100 attempts to travel over the obstacle 414. In effect, the view of FIG. 5 represents the third obstacle clearance expectation discussed above.

The forward view 400 additionally has symbology 416a, 416b, 416c, 418 that more generally represents the obstacle clearance expectation and/or proposes responses to improve or address the obstacle clearance expectation. For example, in FIG. 5, the icons 416a, 416b, 416c represent example recommendations in response to the obstacle 414. Any or all of the icons 416a, 416b, 416c may be displayed, as appropriate to the characteristics of the work vehicle 100 and the obstacle 414. The first icon 416a is a stop icon indicating that the work vehicle 100 should not attempt to travel over the obstacle 414. The second icon 416b is an alert arrow indicating that the work vehicle 100 should travel around the obstacle 414. The third icon 416c is an implement icon indicating that the implement 142 of the work vehicle 100 may be used to remove the obstacle 414. As noted above, the controller 104 may generate the appropriate icon or icons 416a, 416b, 416c based on the input data and/or capabilities of the work vehicle 100 and implement 142. Further, the forward view 300 may include a ring 418 that has a color (e.g., red) that represents the relative concern or severity of the obstacle clearance expectation. In further examples, other symbology, graphics, or visual effects may be provided to convey relative concern or severity of the obstacle clearance expectation, including alternative symbols, display backgrounds, and/or display backlight colors.

The side view 430 of the situation display 390 also represents the relationship between the work vehicle 100 and the obstacle. In particular, the side view 430 includes an undercarriage outline 440 of the work vehicle 100 on the ground 442 and symbology representing an obstacle 444 that has been identified within the trajectory of the work vehicle 100. The side view 430 depicts the relative longitudinal position of the obstacle 444 from the undercarriage outline 440 at which the work vehicle 100 is projected pass over the obstacle 444. As shown in the particular situation of FIG. 5, the obstacle 444 is positioned at a relatively small distance from the work vehicle 100 (e.g., indicating that the work vehicle 100 has little room to maneuver, if necessary or desired). The side view 430 additionally has symbology 448 that more generally represents the obstacle clearance expectation, particularly a ring 448 that has a color (e.g., red) that represents the nature of the obstacle clearance expectation. In effect, the ring 448 mirrors the color and/or visual effect of the ring 418. As noted above, other mechanisms may be used to convey the relative concern or severity of the obstacle clearance expectation.

Additional symbology may be provided outside of the forward view 400 and side view 430. As an example, an icon may be provided to inform the operator about the obstacle and further indicate that the current trajectory of the work vehicle 100 is such that the obstacle is an issue.

As noted above, the undercarriage clearance system 102 may continue to monitor the incoming data such that, if the conditions change, the display 390 will be updated. As such, if the operator adjusts the trajectory, the display 390 will correspondingly adjust to enable the operator to judge the proper amount of trajectory manipulation that allows the work vehicle 100 to pass around the obstacle. In other words, the operator may make changes to the trajectory to reduce the obstacle clearance expectation, e.g., perhaps reflecting a change that eliminates the third obstacle clearance expectation of FIG. 5 to enable the work vehicle 100 to continue on the overall path.

Figure 6:
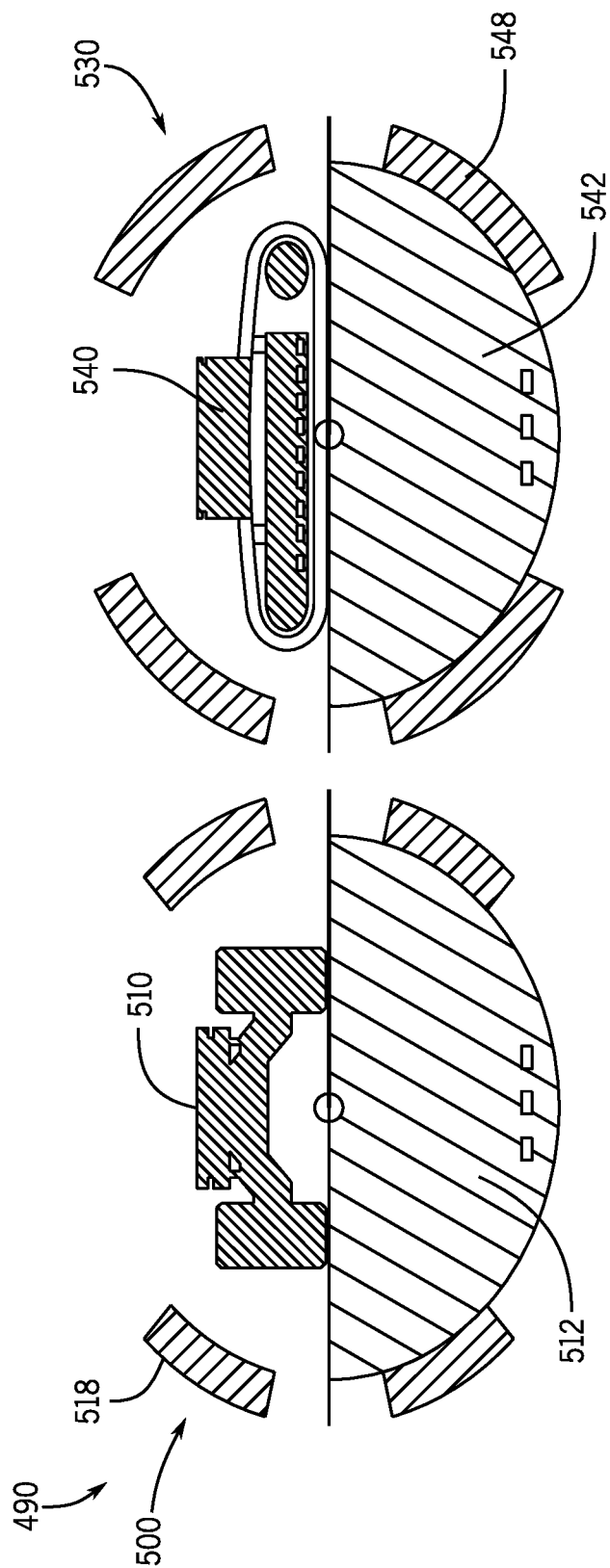

In addition to displays associated with the characterization of the obstacle clearance expectations such as shown in FIGS. 3-5, the undercarriage clearance system 102 may also identify issues associated with the environment sensor 106, particularly when the environment sensor 106 is obscured by debris. As one example, the view of FIG. 6 provides a display 490 generated by the controller 104 when the environment sensor 106 is obscured by debris. As in the displays 190, 290, 390 above, the display 490 has symbology representing front and side views 500, 530 with undercarriage outlines 510, 540 positioned on the ground 512, 542 and surrounded by rings 518, 548 (or other graphics) representing the current obstacle clearance expectation, including the lack of an identified obstacle. In FIG. 5, the obstacle clearance expectation associated with an obstacle is acceptable. However, in the situation of FIG. 5, the environment sensor 106 is obscured, and the issue with the sensor 106 is reflected by a color change of the undercarriage outlines 510, 540, as well as an advisory icon, although any mechanism may be provided to communicate the information to the operator.

The undercarriage clearance system discussed herein may further be embodied as a method for a work vehicle. In particular, the method includes collecting, with a first sensor, ground environment data within the vehicle trajectory; receiving, at a controller, the ground environment data from the first sensor; accessing, by the controller from a datastore, undercarriage geometry data associated with an undercarriage assembly of the work vehicle including ground clearance data of the undercarriage assembly across a lateral dimension of a wheelbase of the work vehicle; identifying, with the controller, an obstacle within the vehicle trajectory; evaluating, with the controller, a height of the identified obstacle and a projected path of the obstacle within the wheelbase of the work vehicle along the vehicle trajectory relative to the undercarriage geometry data to determine an obstacle clearance expectation; generating, with the controller, an alert command signal based on the determination of the obstacle clearance expectation; and rendering, on a display device, a display based on the alert command signal representing the obstacle clearance expectation. In one example, the obstacle clearance expectation is evaluated as a first obstacle clearance expectation when the trajectory is such that the undercarriage assembly is projected to pass over the obstacle without contacting the obstacle; the obstacle clearance expectation is evaluated as a second obstacle clearance expectation when the trajectory is such that the undercarriage assembly is projected to contact the obstacle but the undercarriage assembly is projected to pass over the obstacle without contact on an adjusted trajectory; and the obstacle risk condition is evaluated as a third obstacle clearance expectation when no portion of the undercarriage assembly has a clearance to pass over the obstacle without contact.

Accordingly, the present disclosure provides an undercarriage clearance system and method for a work vehicle. Such systems and methods provide improved and more efficient operation, as well as improved life for the undercarriage. In some instances, the undercarriage clearance system and method may be at least partially implemented with existing hardware components to prevent or mitigate acute and/or gradual degradation and damages to undercarriage assembly and to improve safety by providing visibility in blind and low visibility spots. The undercarriage clearance system may provide improved confidence and decision making for the machine operator due to better visibility or indication of obstacles, especially on steep slopes. The undercarriage clearance system may provide a visual display that is less distracting than other mechanisms (e.g., continuous video monitoring) and enables the operator to provide additional focus to other operational tasks. Further, in some examples, the undercarriage clearance system enables a data log for vehicle or operator diagnostics, as well as warranty issues.

Also, the following examples are provided, which are numbered for easier reference.

1. An undercarriage clearance system for a work vehicle configured to operate along a vehicle trajectory, the undercarriage clearance system comprising: a datastore containing undercarriage geometry data associated with an undercarriage assembly of the work vehicle including ground clearance data of the undercarriage assembly across a lateral dimension of a wheelbase of the work vehicle; a first sensor configured to collect ground environment data within the vehicle trajectory; a controller coupled to the first sensor and the datastore, the controller having a processor and memory architecture configured to: receive the undercarriage geometry data from the datastore; receive the ground environment data from the first sensor; identify an obstacle within the vehicle trajectory; evaluate a height of the identified obstacle and a projected path of the obstacle within the wheelbase of the work vehicle along the vehicle trajectory relative to the undercarriage geometry data to determine an obstacle clearance expectation; and generate an alert command signal based on the determination of the obstacle clearance expectation; and a display device coupled to the controller to receive the alert command signal and configured to render a display based on the alert command signal representing the obstacle clearance expectation.

2. The undercarriage clearance system of example 1, wherein the ground clearance data defines, within the lateral dimension of the wheelbase of the work vehicle, locations of greater or lesser spacing of the undercarriage assembly from a reference ground plane on which ride ground-engaging wheels or tracks of the work vehicle; and wherein the controller evaluates the projected path of the identified obstacle relative to the locations of greater or lesser spacing from the reference ground plane of the ground clearance data to determine the obstacle clearance expectation.

3. The undercarriage clearance system of example 2, wherein the controller is configured to ignore obstacles outside of the wheelbase of the work vehicle along the projected path of the vehicle trajectory.

4. The undercarriage clearance system of example 2, wherein the controller is configured to determine the obstacle clearance expectation as a first obstacle clearance expectation when the projected path, the height of the identified obstacle, and the undercarriage geometry data are such that the undercarriage assembly is projected to pass over the identified obstacle without contacting the identified obstacle and to determine the obstacle clearance expectation as a second obstacle clearance expectation when the projected path, the height of the identified obstacle, and the undercarriage geometry data are such that the undercarriage assembly is projected to contact the identified obstacle.

5. The undercarriage clearance system of example 4, wherein the controller is further configured to determine the obstacle clearance expectation as the second obstacle clearance expectation when the height of the identified obstacle and the undercarriage geometry data are such that an adjusted vehicle trajectory with an adjusted projected path enables intersection of the work vehicle with the identified obstacle at one of the locations of greater spacing of the undercarriage assembly with clearance sufficient to pass over the identified obstacle without contact.

6. The undercarriage clearance system of example 5, wherein the controller is configured to determine the obstacle clearance expectation as a third obstacle clearance expectation when no portion of the undercarriage assembly has a clearance to pass over the identified obstacle without contact.

7. The undercarriage clearance system of example 1, further comprising a second sensor coupled to the controller and configured to collect position data associated with the work vehicle, wherein the controller is configured to determine the vehicle trajectory based on the position data.

8. The undercarriage clearance system of example 1, wherein the controller is configured to generate the alert command signal such that the display device renders the display with a forward view having a first outline of the undercarriage assembly and first symbology representing the identified obstacle that depicts a projected intersection of the identified obstacle and the undercarriage assembly based on the vehicle trajectory.

9. The undercarriage clearance system of example 8, wherein the controller is configured to generate the alert command signal such that the display device renders the display with a side view having a second outline of the undercarriage assembly and second symbology representing the identified obstacle that depicts a relative distance between the undercarriage assembly and the identified obstacle.

10. The undercarriage clearance system of example 1, wherein the controller is configured to generate the alert command signal such that the display device renders the display with a recommendation in view of the obstacle clearance expectation.

11. The undercarriage clearance system of example 10, wherein the controller is configured to generate the alert command signal such that the display device renders the display with the recommendation representing an adjusted trajectory in view of the obstacle clearance expectation.

12. The undercarriage clearance system of example 10, wherein the controller is configured to generate the alert command signal such that the display device renders the display with the recommendation representing an implement recommendation in view of the obstacle clearance expectation.

13. The undercarriage clearance system of example 10, wherein the controller is configured to generate the alert command signal such that the display device renders the display with the recommendation representing a sensor issue.

14. A method of operating an undercarriage clearance system for a work vehicle configured to operate along a vehicle trajectory, the method comprising: collecting, with a first sensor, ground environment data within the vehicle trajectory; receiving, at a controller, the ground environment data from the first sensor; accessing, by the controller from a datastore, undercarriage geometry data associated with an undercarriage assembly of the work vehicle including ground clearance data of the undercarriage assembly across a lateral dimension of a wheelbase of the work vehicle; identifying, with the controller, an obstacle within the vehicle trajectory; evaluating, with the controller, a height of the identified obstacle and a projected path of the obstacle within the wheelbase of the work vehicle along the vehicle trajectory relative to the undercarriage geometry data to determine an obstacle clearance expectation; generating, with the controller, an alert command signal based on the determination of the obstacle clearance expectation; and rendering, on a display device, a display based on the alert command signal representing the obstacle clearance expectation.

15. The method of example 14, wherein the ground clearance data defines, within the lateral dimension of the wheelbase of the work vehicle, locations of greater or lesser spacing of the undercarriage assembly from a reference ground plane on which ride ground-engaging wheels or tracks of the work vehicle; and wherein the evaluating step includes evaluating the projected path of the identified obstacle relative to the locations of greater or lesser spacing from the reference ground plane of the ground clearance data to determine the obstacle clearance expectation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An undercarriage clearance system for a work vehicle configured to operate along a vehicle trajectory, the undercarriage clearance system comprising:
   a datastore containing undercarriage geometry data associated with an undercarriage assembly of the work vehicle including ground clearance data of the undercarriage assembly across a lateral dimension of a wheelbase of the work vehicle;
   a first sensor configured to collect ground environment data within the vehicle trajectory;
   a controller coupled to the first sensor and the datastore, the controller having a processor and memory architecture configured to:
      receive the undercarriage geometry data from the datastore;
      receive the ground environment data from the first sensor;
      identify an obstacle within the vehicle trajectory;

evaluate a height of the identified obstacle and a projected path of the obstacle within the wheelbase of the work vehicle along the vehicle trajectory relative to the undercarriage geometry data to determine an obstacle clearance expectation; and generate an alert command signal based on the determination of the obstacle clearance expectation; and a display device coupled to the controller to receive the alert command signal and configured to render a display based on the alert command signal representing the obstacle clearance expectation;

wherein the controller is configured to generate the alert command signal such that the display device renders the display with a forward view having a first outline of the undercarriage assembly and first symbology representing the identified obstacle that depicts a projected intersection of the identified obstacle and the undercarriage assembly based on the vehicle trajectory.

2. The undercarriage clearance system of claim 1, wherein the ground clearance data defines, within the lateral dimension of the wheelbase of the work vehicle, locations of greater or lesser spacing of the undercarriage assembly from a reference ground plane on which ride ground-engaging wheels or tracks of the work vehicle; and wherein the controller evaluates the projected path of the identified obstacle relative to the locations of greater or lesser spacing from the reference ground plane of the ground clearance data to determine the obstacle clearance expectation.

3. The undercarriage clearance system of claim 2, wherein the controller is configured to ignore obstacles outside of the wheelbase of the work vehicle along the projected path of the vehicle trajectory.

4. The undercarriage clearance system of claim 2, wherein the controller is configured to determine the obstacle clearance expectation as a first obstacle clearance expectation when the projected path, the height of the identified obstacle, and the undercarriage geometry data are such that the undercarriage assembly is projected to pass over the identified obstacle without contacting the identified obstacle and to determine the obstacle clearance expectation as a second obstacle clearance expectation when the projected path, the height of the identified obstacle, and the undercarriage geometry data are such that the undercarriage assembly is projected to contact the identified obstacle.

5. The undercarriage clearance system of claim 4, wherein the controller is further configured to determine the obstacle clearance expectation as the second obstacle clearance expectation when the height of the identified obstacle and the undercarriage geometry data are such that an adjusted vehicle trajectory with an adjusted projected path enables intersection of the work vehicle with the identified obstacle at one of the locations of greater spacing of the undercarriage assembly with clearance sufficient to pass over the identified obstacle without contact.

6. The undercarriage clearance system of claim 5, wherein the controller is configured to determine the obstacle clearance expectation as a third obstacle clearance expectation when no portion of the undercarriage assembly has a clearance to pass over the identified obstacle without contact.

7. The undercarriage clearance system of claim 1, further comprising a second sensor coupled to the controller and configured to collect position data associated with the work vehicle, wherein the controller is configured to determine the vehicle trajectory based on the position data.

8. The undercarriage clearance system of claim 1, wherein the controller is configured to generate the alert command signal such that the display device renders the display with a side view having a second outline of the undercarriage assembly and second symbology representing the identified obstacle that depicts a relative distance between the undercarriage assembly and the identified obstacle.

9. The undercarriage clearance system of claim 1, wherein the controller is configured to generate the alert command signal such that the display device renders the display with a recommendation in view of the obstacle clearance expectation.

10. The undercarriage clearance system of claim 9, wherein the controller is configured to generate the alert command signal such that the display device renders the display with the recommendation representing an adjusted trajectory in view of the obstacle clearance expectation.

11. The undercarriage clearance system of claim 9, wherein the controller is configured to generate the alert command signal such that the display device renders the display with the recommendation representing an implement recommendation in view of the obstacle clearance expectation.

12. The undercarriage clearance system of claim 9, wherein the controller is configured to generate the alert command signal such that the display device renders the display with the recommendation representing a sensor issue.

13. A method of operating an undercarriage clearance system for a work vehicle configured to operate along a vehicle trajectory, the method comprising:

collecting, with a first sensor, ground environment data within the vehicle trajectory;

receiving, at a controller, the ground environment data from the first sensor;

accessing, by the controller from a datastore, undercarriage geometry data associated with an undercarriage assembly of the work vehicle including ground clearance data of the undercarriage assembly across a lateral dimension of a wheelbase of the work vehicle;

identifying, with the controller, an obstacle within the vehicle trajectory;

evaluating, with the controller, a height of the identified obstacle and a projected path of the obstacle within the wheelbase of the work vehicle along the vehicle trajectory relative to the undercarriage geometry data to determine an obstacle clearance expectation;

generating, with the controller, an alert command signal based on the determination of the obstacle clearance expectation; and rendering, on a display device, a display based on the alert command signal representing the obstacle clearance expectation, including rendering the display with a forward view having a first outline of the undercarriage assembly and first symbology representing the identified obstacle that depicts a projected intersection of the identified obstacle and the undercarriage assembly based on the vehicle trajectory.

14. The method of claim 13, wherein the ground clearance data defines, within the lateral dimension of the wheelbase of the work vehicle, locations of greater or lesser spacing of the undercarriage assembly from a reference ground plane on which ride ground-engaging wheels or tracks of the work vehicle; and wherein the evaluating step includes evaluating the projected path of the identified obstacle relative to the locations of greater or lesser spacing from the reference ground plane of the ground clearance data to determine the obstacle clearance expectation.

15. The method of claim 14, wherein the evaluating step includes:
    determining the obstacle clearance expectation as a first obstacle clearance expectation when the vehicle trajectory is such that the undercarriage assembly is projected to pass over the identified obstacle without contacting the identified obstacle; and
    determining the obstacle clearance expectation as a second obstacle clearance expectation when the projected path, the height of the identified obstacle, and the undercarriage geometry data are such that the undercarriage assembly is projected to contact the identified obstacle and when the height of the identified obstacle and the undercarriage geometry data are such that an adjusted vehicle trajectory with an adjusted projected path enables intersection of the work vehicle with the identified obstacle at one of the locations of greater spacing of the undercarriage assembly with clearance sufficient to pass over the identified obstacle without contact.

16. The method of claim 15, wherein the evaluating step includes determining the obstacle clearance expectation as a third obstacle clearance expectation when no portion of the undercarriage assembly has a clearance to pass over the identified obstacle without contact.

17. The method of claim 13, further comprising:
    collecting, with a second sensor, position data associated with the work vehicle; and
    determining, with the controller, the vehicle trajectory based on the position data.

18. The method of claim 13, wherein the rendering step includes rendering the display with a side view having a second outline of the undercarriage assembly and second symbology representing the identified obstacle that depicts a relative distance between the undercarriage assembly and the identified obstacle.

* * * * *